Dec. 30, 1947.   A. SPRIGMAN   2,433,794
DIAL LOCK
Filed March 9, 1944   2 Sheets-Sheet 1
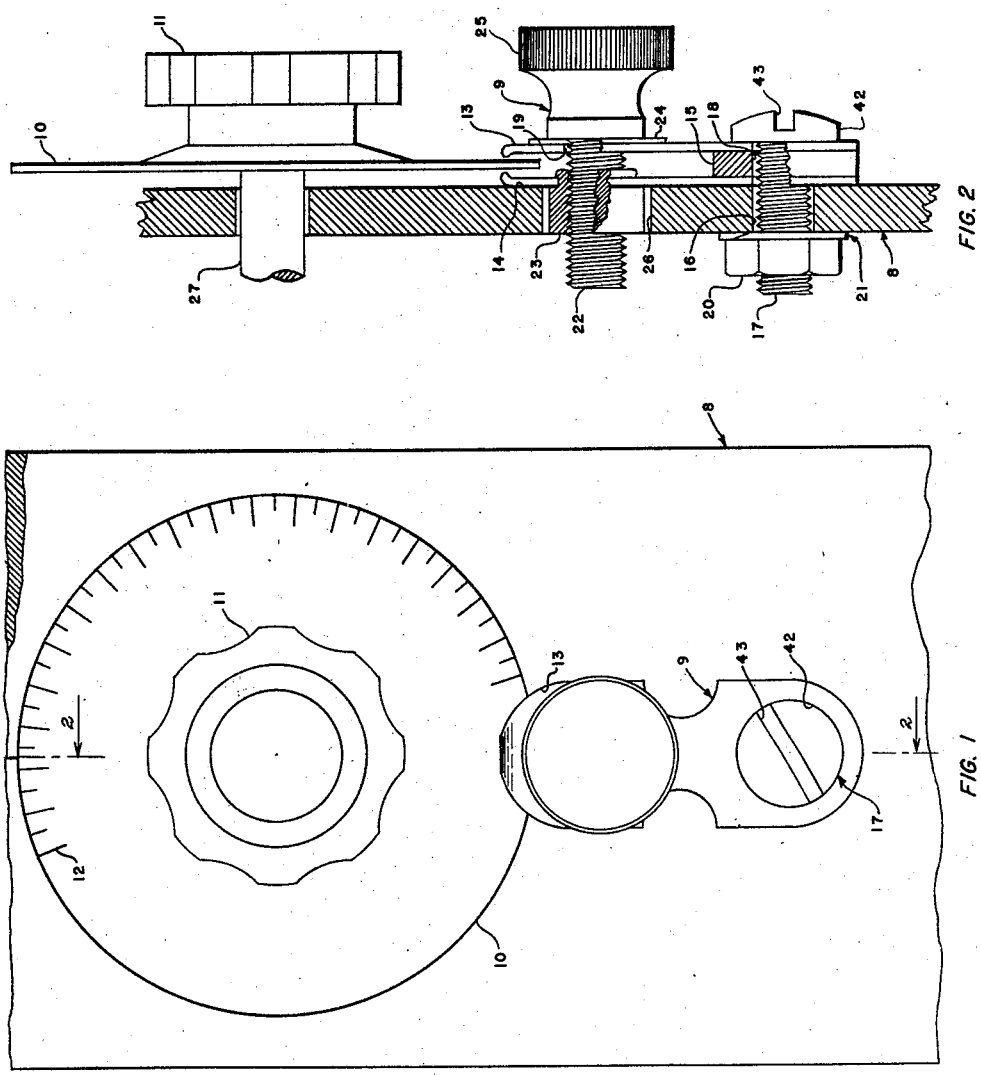
ARTHUR SPRIGMAN
INVENTOR
By Herbert J Smith
ATTORNEY Dec. 30, 1947.  A. SPRIGMAN  2,433,794
DIAL LOCK
Filed March 9, 1944   2 Sheets-Sheet 2
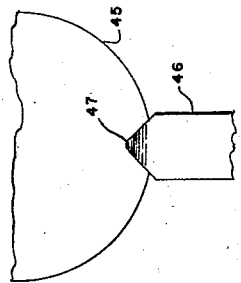
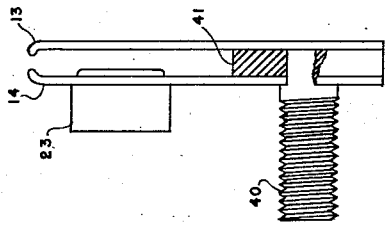
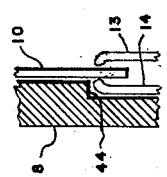
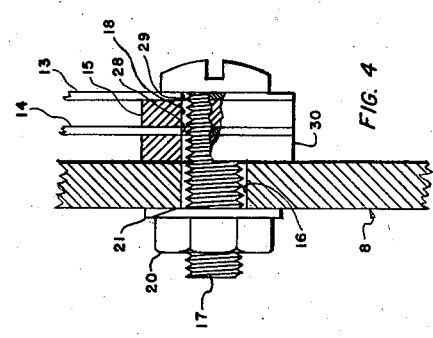
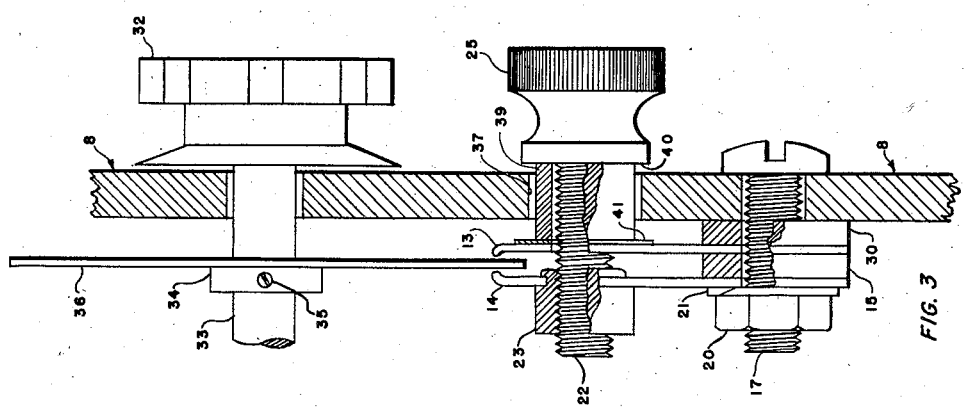
ARTHUR SPRIGMAN
INVENTOR
By Herbert J Smith
ATTORNEY Patented Dec. 30, 1947

2,433,794

UNITED STATES PATENT OFFICE 2,433,794

DIAL LOCK

Arthur Sprigman, Flushing, N. Y., assignor, by mesne assignments, to Farnsworth Research Corporation, a corporation of Indiana Application March 9, 1944, Serial No. 525,789

6 Claims. (Cl. 188—73)

This invention pertains to indicator securing devices and more particularly to a device for holding an indicator or dial in a fixed position so that the setting of the indicator or dial will not vary due to vibration or natural off-balance of the dial and its associated parts.

In the present disclosure, a dial, such as may be employed on a radio set, is shown to represent a specific application of the invention.

Heretofore, indicator securing devices or dial locks have been used which usually have a portion of one side of the indicator or dial in frictional engagement with at least one surface of the dial gripping means to be used to secure the dial in a fixed position.

The present invention contemplates the use of a dial gripping means having two opposing surfaces for engaging the front and rear surfaces of a dial, said dial gripping means being normally spaced from the front and rear surfaces of the dial per se when the dial lock is not in operative locked position.

Frequently, dial locks of the general character to which this invention pertains, employ one fixed jaw and one movable jaw. After the dial was set in a fixed position, a threaded member was rotated so that the movable jaw could engage one surface of the dial, usually causing the dial to be distorted when one surface of the dial was brought into frictional engagement with the fixed jaw. When this condition existed, the distortion of the dial would cause a slight rotation thereof, thereby varying the previous adjustment. This factor is of prime importance when the dial is employed on radio equipment, such as a radio transmitter or receiver, or when used with sensitive test equipment. When critical adjustments are required on radio equipment for sharp tuning, it becomes highly essential that there is absolutely no rotation of the dial or the tuning equipment once the adjustment is attained.

While this present invention is shown in conjunction with a disc-type dial, it is to be understood that it may be employed on an indicator of the drum type or any other type wherein the indicator may be gripped between a pair of movable jaws.

The present invention also contemplates setting one of the movable jaws into the panel so that the one surface of the dial may be in contiguous or substantially contiguous relation with one side of the panel. In this arrangement one of the movable jaws will be recessed, or partially recessed, within the panel, and the other of the movable jaws will be disposed on the opposite side of the dial as disclosed in the drawings, both of said movable jaws being in spaced relation from the dial when the dial lock is in an inoperative position. However, when the dial lock has been operated to grip the dial, both of the resilient movable jaws will be brought toward each other in a suitable manner.

The resiliency of the dial engaging jaws is such that a precise centralizing of the dial between the jaws is not necessarily essential, because if one of the jaws engages the dial before the other of the jaws, the first engaging jaw will be restrained and held in a substantially stationary position, while the opposing jaw is moved toward the dial. Therefore, there is a floating action between the two jaws which becomes effective as soon as one of the jaws engages either surface of the dial. This becomes quite important in eliminating distortion when the dial has a normal distortion about the peripheral edge thereof, and also eliminates the necessity of a critical centralization of the dial between the jaws.

It is therefore an object of the present invention to provide an anti-rotational device which affords substantially equal pressure against the opposing surfaces of an indicator with a minimum of distortion thereof.

It is a further object of the invention to provide an anti-rotational device having a pair of gripping members secured at one end thereof to a supporting structure, while the other ends of said gripping members are provided with a floating action as soon as one of said gripping members engages the indicator without particular concern for the inherent distortion of the dial or the critical centralization of said dial between the dial engaging surfaces of the gripping members.

A further object of the invention is to provide a pair of gripping members which are secured to a spacing member at one end thereof, while one of said gripping members adjacent the other end thereof has a threaded portion secured thereto for threadedly engaging a screw which causes the free ends of both of said gripping members to be brought toward each other when the screw is rotated in a proper direction.

A further object of the invention is to provide an anti-rotational device having a pair of gripping members which are secured to a spacing member adjacent one end thereof, while the free ends of said gripping members include means for threadedly engaging one of said gripping members and pressure means for engaging the other of said members to enable the free ends of both of said gripping members to be moved toward each other.

A further object of the invention is to provide an anti-rotational device or dial lock having a pair of resiliently mounted gripping members secured to a supporting structure, while the free ends of the gripping members have means for moving the jaws thereof toward each other at substantially the same rate of speed.

A further object of the invention is to provide a dial lock having interchangeable spacers for disposing the gripping members in a predetermined position in relation to the dial lock supporting structure to enable a suitable centralization of the gripping members in relation to the dial or indicator regardless of the spacing of the dial indicator from the supporting structure.

A further object of the invention is to provide an anti-rotational device having interchangeable spacers for locating the dial lock gripping members adjacent their supporting structure so that the dial lock may be used in conjunction with the member to be gripped whether said member be in front of or in the rear of the supporting structure.

A further object of the invention is to provide an interchangeable anti-rotational dial gripping device to be used on either the front or the rear of a supporting structure having interchangeable spacers depending on the spacing and thickness of the indicator or dial.

A further object of the invention is to provide a rotational dial gripping device having dial gripping surfaces which are reduced to a minimum area in order to provide as nearly as practicable a pin-point contact between the dial, or dial disc and the dial gripping surfaces.

In the drawings:

Fig. 1 is a front view of the dial lock shown in position for locking a dial which is mounted on a panel.

Fig. 2 is a partial sectional view taken along lines 2—2 of Fig. 1 showing the dial lock mounted in front of the panel.

Fig. 3 is a partial sectional view, partially broken away, showing the dial lock mounted in the rear of the panel for gripping the disc which is securely connected to the dial shaft.

Fig. 4 is a partial sectional view showing the spacing means for centralizing the dial gripping members by adequately spacing said gripping members from the supporting panel.

Fig. 5 is a side view, partially shown in section and broken away, showing the dial gripping members of Fig. 2 with a supporting threaded shaft for said gripping members used in lieu of the slotted screw shown in Fig. 3.

Fig. 6 is a partial view of the dial in close relation to the panel with one of the gripping members shown recessed in the panel.

Fig. 7 shows a dial with one of the gripping members coming substantially to a point where the gripping member engages the dial.

Referring to the drawings, and more particularly to Fig. 1, a panel 8 is shown having a dial lock assembly 9 disposed to grip a dial 10, having graduations 12 thereon. The knob 11 is connected to the dial 10 for rotating said dial and its associated tuning equipment, not shown.

In conjunction with Figs. 1 and 2, the dial lock assembly 9 has a pair of gripping members 13 and 14 which are associated by a spacer 15. The spacer 15 and the two dial gripping members 13 and 14, respectively, are secured together in any convenient manner, such as by soldering. The panel 8 has the opening 16 so that the stud 17 might be inserted therethrough. The stud also passes through the opening 18 in the spacer 15 and the lower end of the dial gripping members 13 and 14. A head 42 on the screw 17 engages the front side of the dial gripping member 13, while a nut 20 and a lockwasher 21 are used to hold the screw securely in place when mounted on the panel 8. The upper end of the dial gripping member 13 has an opening 19 therein, through which a knurled headed screw 22 is inserted and is connected with the threaded collar 23, which collar is secured adjacent the upper end of the dial gripping member 14. A washer 24 is placed between the shoulder of the head portion 25 of the knurled headed screw 22 and the outer surface of the dial gripping member 13.

When the knurled head 25 of the screw 23 is rotated in a clockwise position, the dial gripping members 13 and 14, respectively, will be drawn toward each other at the same rate of speed until the dial 10 is securely gripped by the members 13 and 14 thereby preventing any appreciable rotation of the dial 10. An opening 26 in the panel 8 permits the threaded member 23 to move freely therein without any frictional engagement between the threaded member 23 and the opening in the panel.

The arcuate shape of the upper portion of the member 13 is such that the contact engagement surface of the gripping member 13, as well as of gripping member 14 will grip the dial 10 between the very small area of the dial gripping surfaces on the members 13 and 14. The minimum of the dial gripping areas on the dial gripping fingers 13 and 14 is stressed, since it is desirable to have the smallest area of the dial gripped between the dial gripping members.

The thickness of the spacer 15 will depend, in large part, upon the thickness of the dial 10.

It will therefore be seen that when the dial knob 11 is rotated, it will also rotate the shaft 27 which is connected to the tuning apparatus.

While the dial gripping finger 14 is shown having its rear surface engaging the front of the panel 8, it is to be understood that whether or not this condition exists will depend on the spacing of the dial 10 from the front of the panel 8. This is brought out in further detail in relation to Fig. 4.

The construction shown in Fig. 4 discloses the front and rear dial gripping members 13 and 14, respectively, having an intermediate spacer 15 with the screw 17 being inserted through the holes 28 and 29 in said members 13 and 14 and also through the opening 18 in the intermediate spacer 15.

The hole 16 in the panel 8 is also shown in Fig. 4. A panel spacer 30 is shown disposed between the rear surface of the member 14 and the front surface of the panel 8.

Referring to Fig. 3, the dial lock is shown in use wherein the mounting of the dial gripping members are disposed in the rear of the panel 8. The dial lock screw 22 has the knurled head 25 of said screw 22 disposed in the front of the panel so that it is possible to lock the dial exteriorly of the set much in the same manner as disclosed in Fig. 1.

In Fig. 3, the dial 32 per se is on the front of the panel 8 and is connected to a shaft 33 which operates the tuning mechanism. A collar 34 is securely connected to the shaft 33 in any convenient means, such as by screw 35. A disc 36 may be connected to the shaft 33 directly, or it may be connected to the collar 34 having a diameter appreciably greater than the shaft 33 will lend stability to the disc 36. An opening 37 in the panel 8 permits a collar 39 to be inserted therein, one end of the collar engaging the shoulder 40 on the underneath surface of the knurled head 25, while the other end of the collar 39 engages the washer 41, which washer 41 is located between the collar 39 and one surface of the dial gripping member 13.

The intermediate spacer 15, and the panel spacer 30, shown in Figs. 3 and 4, have the same function in that the intermediate spacer 15 controls the distance between the dial gripping members 13 and 14, while the panel spacer controls the distance between the panel 8 and the dial gripping members nearest to said panel, namely member 14 in Fig. 4 and member 13 in Fig. 3.

Sleeve 39 is primarily controlled in length by the distance of the dial 36 from the rear of the panel 8, and the thickness of the panel, while a certain amount of clearance is left between the shoulder 40 of the knurled head 25 and the front of the panel 8, so that there will be no binding of the screw 22 in normal operation of the dial lock, as shown in Fig. 3.

Similar parts in Figs. 3 and 4 are shown with like character references, since the only addition to the components constituting the dial lock per se are the sleeve 39 with a suitable washer 41. The sleeve 39 has a clearance for the screw 22 and in the hole 37 of the panel 8 so that there will be no binding of the sleeve 39 when the screw 22 is rotated by the knurled head 25.

In Fig. 5, spaced gripping members 13 and 14 are shown similar to those in Figs. 2 and 3 with the threaded collar 23 being securely connected to the gripping member 14. A mounting screw 40 is secured to the intermediate spacer 41, which spacer has a gripping member disposed on each side thereof. In the present showing in Fig. 5, the front end of the mounting screw 40 will not be observed from the front of the panel, since the dial gripping member 13 is flush over the unthreaded end of the mounting screw 40. By using this arrangement, as shown in Fig. 5, the head 42 of the mounting screw 17 (Fig. 2) will not be present, thereby avoiding the possibility of the appearance of a marred screw slot 43 on the front of the panel which would be particularly conspicuous in the event a painted screw head 42 were used with the paint marred due to careless handling of a screw driver when mounting the dial lock.

In Fig. 6 there is shown the arrangement for either a front or rear panel mounting of the dial gripping members 13 and 14. For example, the dial lock may be mounted on the front of the panel, as shown in Fig. 2, with a recess 44 cut into the front of the panel 8, which recess is of sufficient depth to permit the dial 10 to be substantially contiguous with the front of the panel 8. By using this arrangement, a dial lock of the type set forth may be employed in conjunction with a substantially flush mounted dial, which would not be the case if the dial lock were used requiring space between the surface of the mounting panel and on surface of the dial.

In Fig. 7, a dial 45, shown broken away, has a gripping member 46 which comes substantially to an apex or pin point 47. While the apex 47 of the dial gripping member 46 is not shown terminating in an actual pin point, it is represented in the manner shown to indicate that the apex may be a pin point dial contacting surface, or it may be of an area sufficient to avoid appreciable distortion of the dial when the gripping members are drawn together on the opposing sides of said dial, thus assuring a sufficient gripping contact to avoid failure due to vibration or any other undesirable function that may be inherent in the device employing the dial lock, or which may be caused by any external vibratory action.

What is claimed is:

1. A dial lock of the class described comprising a pair of resilient dial gripping members, a spacing member securely connected to each of said dial gripping members adjacent one end thereof, a panel mounting stud rigidly connected to the resilient dial gripping members adjacent the same end of said gripping members as the spacing member and securely holding one end of each of said gripping members and said spacing member in a predetermined position with respect to the dial, a threaded member securely connected to one of said dial gripping members adjacent the end opposite said spacing member while the other of said dial gripping members has an aperture therein adjacent the end opposite said spacing member, the threaded member of one of said dial gripping members being in substantial axial alignment with the aperture of the other of said dial gripping members, a screw member adapted to be inserted through said aperture and into said threaded member, and means on one end of said screw member for rotating same, to the end that the dial gripping members may have the distance varied between the individual dial gripping members at the free end portions thereof, and both said gripping members approach the dial simultaneously and substantially without exerting asymmetrical lateral pressure thereupon.

2. A dial lock of the class described comprising a pair of resilient dial gripping members, a spacing member adjacent one end of the dial gripping members, a panel mounting stud connecting the resilient dial gripping members adjacent the same end of said gripping members as the spacing member firmly to the panel in a position so that the opposite ends of both members are substantially equidistant from the dial, a threaded member securely connected to one of said dial gripping members adjacent the end opposite said spacing member, while the other of said dial gripping members has an aperture therein adjacent the end opposite said spacing member, the threaded member of one of said dial gripping members being in substantial axial alignment with the aperture of the other of said dial gripping members, and a screw member adapted to be inserted through said aperture and into said threaded member, and means on one end of said screw for rotating same to the end that the dial gripping members may have the distance varied between the individual dial gripping members at the free end portions thereof, and both said gripping members approach the dial simultaneously and substantially without exerting asymmetrical lateral pressure thereupon.

3. A dial lock of the class described comprising a pair of resilient dial gripping members, a spacing member adjacent one end of the dial gripping members, panel mounting means connected to the resilient dial gripping members adjacent the same end of said gripping members as the spacing member to position and secure the dial gripping members on a panel in a fixed relationship to the dial, a threaded member securely connected to one of said dial gripping members adjacent the end opposite said spacing member while the other of said dial gripping members has an aperture therein adjacent the end opposite said spacing member, the threaded member of one of said dial gripping members being in substantial axial alignment with the aperture of the other of said dial gripping members, and a screw member adapted to be inserted through said aperture and into said threaded member, and means on one end of said screw for rotating same to the end that the dial gripping members may have the distance varied between the individual dial gripping members at the free end portions thereof, and both said gripping members approach the dial simultaneously without exerting asymmetrical lateral pressure thereupon.

4. A dial lock of the class described comprising a pair of resilient dial gripping members, a spacing member adjacent one end of the dial gripping members, panel mounting means detachably connected to the resilient dial gripping members adjacent the same end of said gripping members as the spacing member to position and secure the dial gripping members on a panel in a fixed relationship to the dial, a threaded member securely connected to one of said dial gripping members adjacent the end opposite said spacing member while the other of said dial gripping members has an aperture therein adjacent the end opposite said spacing member, the threaded member of one of said dial gripping members being in substantial axial alignment with the aperture of the other of said dial gripping members, and a screw member adapted to be inserted through said aperture and into said threaded member, and means on one end of said screw for rotating same to the end that the dial gripping members may have the distance varied between the individual dial gripping members at the free end portions thereof, and that said gripping members make contact with the dial substantially simultaneously.

5. A dial lock of the class described comprising a pair of resilient dial gripping members, a spacing member adjacent one end of the dial gripping members, panel mounting means adjacent the same end of said gripping members as the spacing member to secure the dial gripping members on a panel in a fixed relationship to the dial, a threaded member securely connected to one of said dial gripping members adjacent the end opposite said spacing member while the other of said dial gripping members has an aperture therein adjacent the end opposite said spacing member, the threaded member of one of said dial gripping members being in substantial axial alignment with the aperture of the other of said dial gripping members, a screw member adapted to be inserted through said aperture and into said threaded member, and means on one end of said screw member for rotating said screw member and thereby for bringing said gripping members towards the dial simultaneously and substantially at a uniform rate of approach.

6. A dial lock of the class described comprising a pair of resilient dial gripping members, a spacing member adjacent one end of and between the dial gripping members, a second spacing member intermediate the dial gripping members and a panel, panel mounting means adjacent the same end of said gripping members as said first spacing member to secure the dial gripping members in a panel, a threaded member securely connected to one of said dial gripping members adjacent the end opposite said spacing member while the other of said dial gripping members has an aperture therein adjacent the end opposite said spacing member, the threaded member of one of said dial gripping members being in substantial axial alignment with the aperture of the other of said dial gripping members, a screw member adapted to be inserted through said aperture and into said threaded member, means on one end of said screw member for rotating same, and a sleeve mounted on said screw member between one of said dial gripping members and last said means.

ARTHUR SPRIGMAN.

REFERENCES CITED

The following references are of record in the file of this patent:

UNITED STATES PATENTS

| Number | Name | Date |
|---|---|---|
| 866,278 | Hemenway | Sept. 17, 1907 |
| 1,281,338 | Gargan | Oct. 15, 1918 |
| 456,282 | Athey | July 21, 1891 |
| 2,115,083 | Pierce | Apr. 26, 1938 |